US005531611A

United States Patent [19]
Reed et al.

[11] Patent Number: 5,531,611
[45] Date of Patent: Jul. 2, 1996

[54] CONNECTOR MODULE FOR LOCAL AREA NETWORK

[75] Inventors: Steven J. Reed, Cordova; Scott T. Davies, Germantown; Robert L. Wallgren, Bartlett; George R. Wojtan, Germantown, all of Tenn.

[73] Assignee: Thomas & Betts Corporation, Memphis, Tenn.

[21] Appl. No.: 237,752

[22] Filed: May 4, 1994

[51] Int. Cl.[6] .................................................... H01R 13/60
[52] U.S. Cl. ............................................ 439/540.1; 439/639
[58] Field of Search ........................... 439/540, 638–640, 439/650–655, 492–493

[56] References Cited

U.S. PATENT DOCUMENTS

| | | | |
|---|---|---|---|
| 3,846,740 | 11/1974 | Damon | 439/701 |
| 4,220,391 | 9/1980 | Krolak et al. | 439/540 |
| 4,362,905 | 12/1982 | Ismail | 379/442 |
| 4,408,819 | 10/1983 | Guelden | 439/638 |
| 4,641,900 | 2/1987 | Japngie | 439/651 |
| 4,829,564 | 5/1989 | Jarvis | 439/540 |
| 4,850,897 | 7/1989 | Hard | 439/502 |
| 5,030,128 | 7/1991 | Herron | 439/372 |
| 5,148,353 | 9/1992 | Morgan et al. | 439/341 |
| 5,160,276 | 11/1992 | Marsh et al. | 439/502 |
| 5,276,817 | 1/1994 | Matschke | 395/275 |
| 5,340,326 | 8/1994 | LeMaster | 439/207 |
| 5,366,388 | 11/1994 | Freeman et al. | 439/540 |
| 5,384,692 | 1/1995 | Jaff | 439/68 |

Primary Examiner—P. Austin Bradley
Assistant Examiner—Jill DeMello
Attorney, Agent, or Firm—Salvatore J. Abbruzzese

[57] ABSTRACT

A connector module for use in a local area network having a plurality of workstations in connection with a hub, wherein each workstation is hard wired to a printed circuit board mounted in the module. The module further includes a wiring assembly connected to the board and a cable leading from the hub. The face of the panel includes a plurality of jacks mounted therein, which are also electrically connected to the printed circuit board. Initially, workstations are electrically connected to the hub through the wiring assembly, which is preferably a twisted pair flat cable. Alternately, the wiring assembly may be disconnected from the board, and an upgraded hub interconnected with the workstations through the jacks in the face of the module with minimal re-wiring required.

10 Claims, 3 Drawing Sheets

CONNECTOR MODULE FOR LOCAL AREA NETWORK

FIELD OF THE INVENTION

The present invention relates generally to electrical hardware for use in local area network systems and, more particularly, to a modular replacement for a patch panel interconnecting a plurality of workstations to a hub.

BACKGROUND OF THE INVENTION

Local area network (LAN) systems are becoming increasingly popular in the modern work place. Typically, LAN systems comprise a plurality of cubicles, or workstations, each having a telephone and computer terminal for use by the employee assigned to the workstation. Each workstation, therefore, has wiring associated therewith for establishing voice and data communication to the telephone and computer, respectively, through which the workstation is connected to the network. A popular example of such a system is Ethernet, a baseband LAN supported by Xerox, Digital Equipment Corporation, and Intel.

In conventional LAN systems, the wiring from each workstation is routed into a wiring closet and electrically connected to one of a plurality of patch panels disposed therein. Each patch panel is, in turn, connected to a hub by a plurality of patch cables having suitable connectors at each end. In a relatively large LAN system, it is not uncommon for a wiring closet to include numerous patch panels (sometimes referred to as distribution panels), hubs, and related components, all of which are interconnected by an assortment of patch cables.

As a conventional network grows in terms of the number of workstations and their capabilities, so does the number of patch cables. At some point, the number of patch panels and associated patch cables may become effectively unmanageable, making the addition or substitution of equipment inordinately difficult, time-consuming, and error prone. This problem has been most recently recognized when a system including patch panels and patch cables is upgraded from a Category 3 (operating at 10 megahertz) to a Category 5 (operating at 100 megahertz), which typically requires replacing and/or reconnecting all affected patch panels and cables from the original hub to the upgraded hub. With the regular introduction of newer, faster equipment in the industry, such physical obstacles to upgrading a system are becoming increasingly problematic. Accordingly, it has been found highly desirable to devise an apparatus which facilitates the installation of upgraded electronics in a LAN system.

SUMMARY OF THE INVENTION

It is an object of the present invention to provide a connector module specially adapted to interconnect a plurality of workstations to either of two hub configurations.

It is another object of this invention to provide a connector module which eliminates the necessity of a patch panel.

A further object is to provide a connector module having a plurality of test ports by which the operation of a particular workstation may be monitored.

In order to achieve these and other objects, the present invention comprises a connector module for selectively interconnecting a plurality of workstations to a first or second hub, each said hub having a port with cable means associated therewith and capable of operating at different frequencies. The connector module comprises a panel having a face portion, a first connector mounted to the panel adapted for connection to the first hub, a printed circuit board mounted to the panel having a plurality of electrically conductive paths disposed thereon, a second connector removably connected to the circuit board and an electrical communication with the conductive paths, and wiring means electrically interconnecting the first and second connectors. A plurality of third connectors are mounted on the circuit board, also an electrical connection with the conductive paths, with each of the third connectors being operatively connected to an individual workstation, thereby interconnecting the workstations with the first hub. A plurality of fourth connectors are also mounted on the panel and electrically connected to the conductive paths, adapted for connection to the second hub. Upon disconnecting the second connector from the circuit board and connecting the fourth connectors to the second hub, the workstations are interconnected to the second hub.

The above-stated and other objects of this invention will become apparent to those skilled in the art upon reading the following detailed description, in conjunction with the appended drawings.

DETAILED DESCRIPTION OF THE PREFERRED EMBODIMENT

Figure 1:
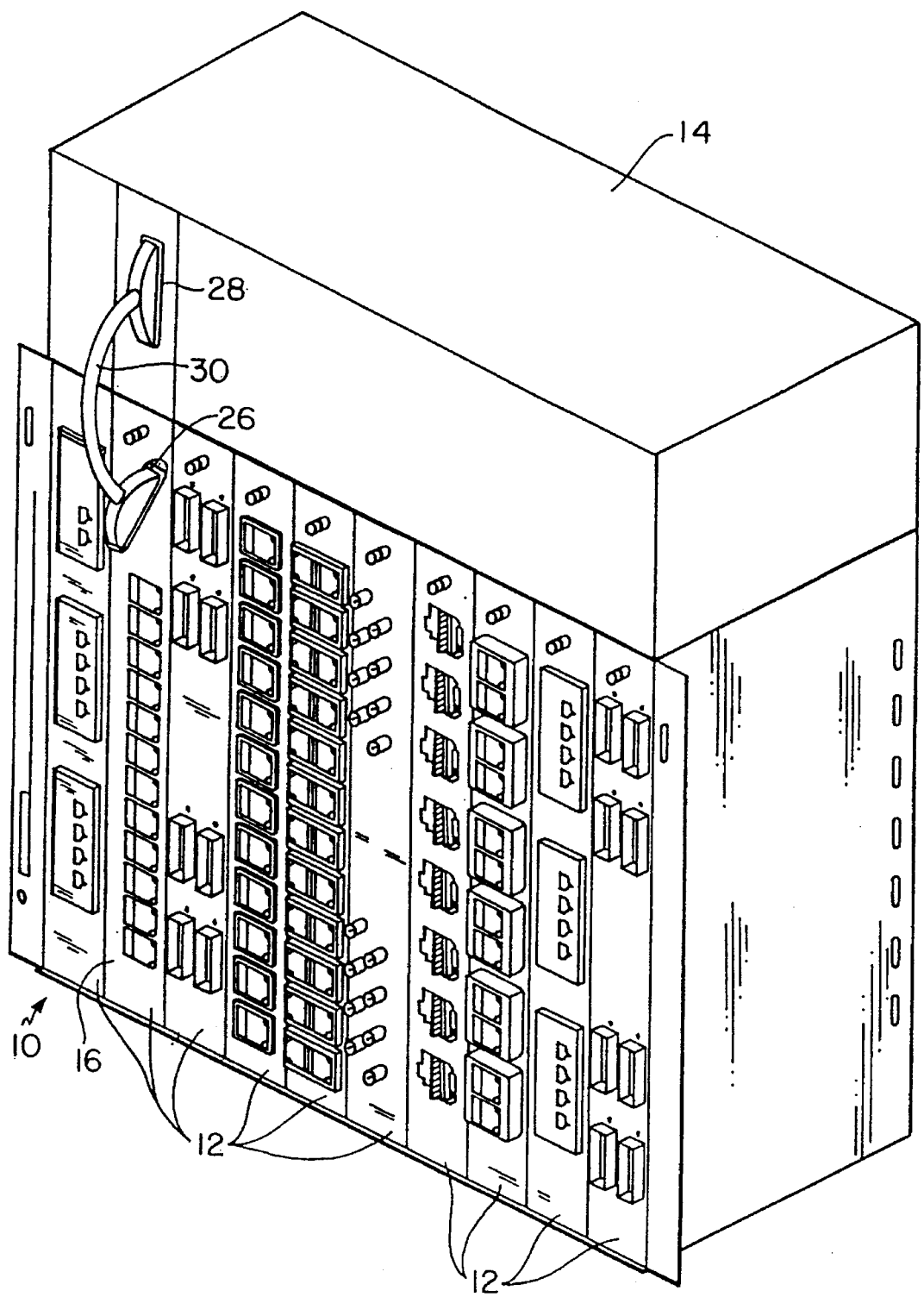
FIG. 1 is a top, side perspective view of a vertical cabinet incorporating the preferred module of the present invention.

Referring initially to FIG. 1, Cabinet 10 is shown having a plurality of modules 12 slidably mounted therein. As those skilled in the art will recognize, each module 12 has a plurality of electrical connectors mounted in its face for connecting various components to hub 14, with different connectors specially adapted to accommodate different types of transmission media and/or frequencies. In the preferred embodiment disclosed herein, the principles of this invention are embodied in module 16 discussed more fully below.

Figures 2, 3:
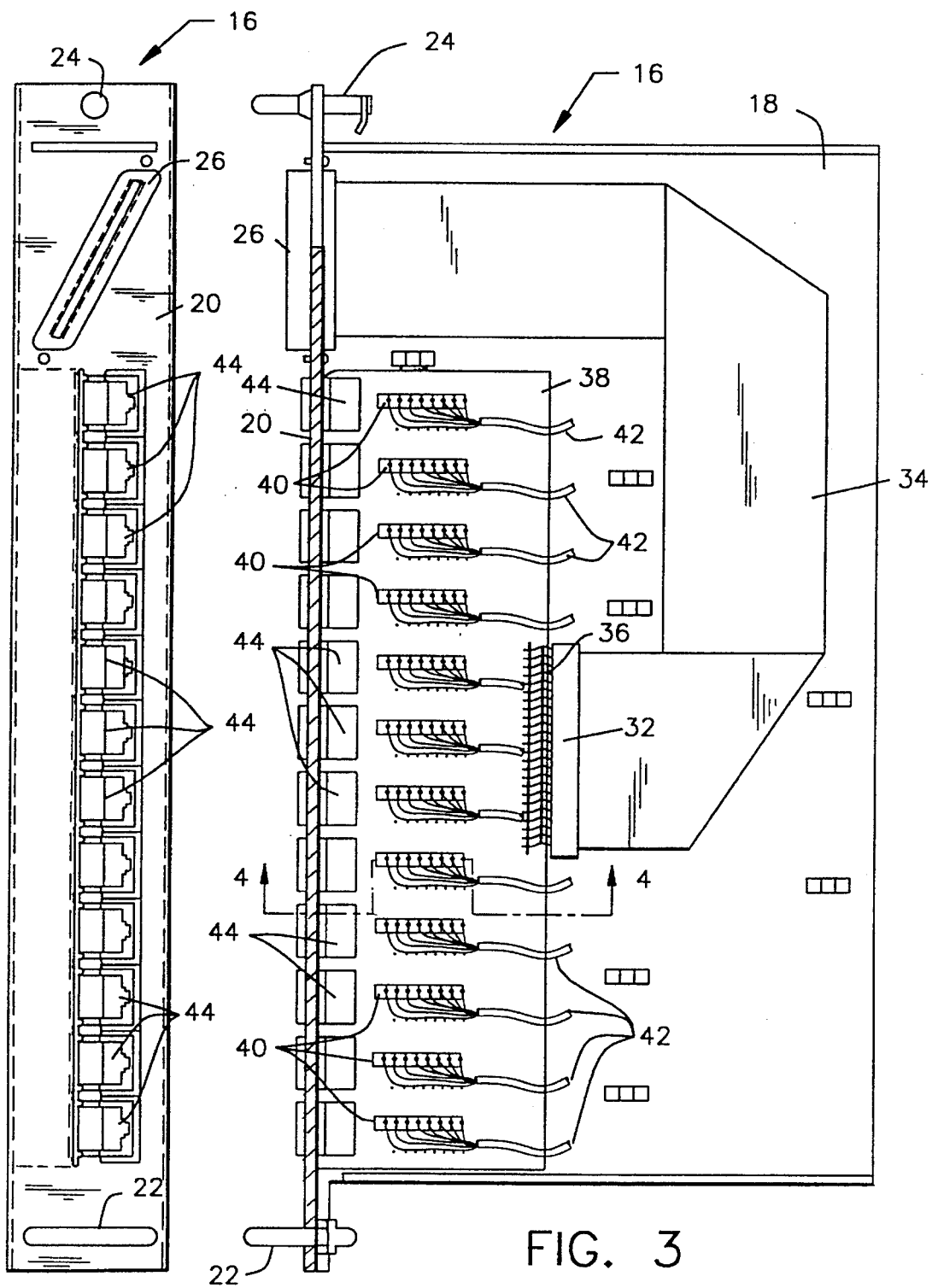
FIG. 2 is a front elevational view of the module of the present invention.
FIG. 3 is a side elevational view of the module shown in FIG. 2.
Figure 4:
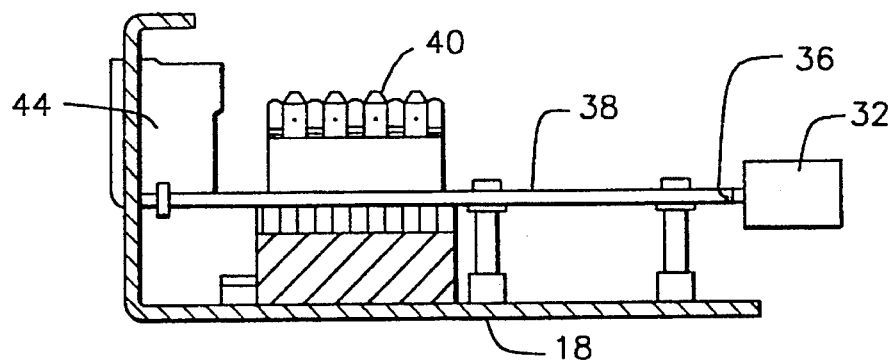
FIG. 4 is a sectional view taken along line 4—4 of FIG. 3.

In FIGS. 2 through 4, module 16 is shown comprising a substantially flat, horizontal panel 18 with front face 20 at a right angle thereto. Handle 22 is mounted in face 20 to facilitate installation and removal of module 16 into cabinet 10, while latch 24 is included to secure panel 16 in position. Connector 26 is also mounted in face 20 of module 16 and, as shown in FIG. 1, is adapted for connection with port 28 of hub 14 by cable 30. Connector 20 is electrically connected to connector 32 by means of wiring assembly 34. Connector 32 is, when configured as shown on FIG. 3, connected to terminal 36 of printed circuit board 38. In the preferred embodiment shown, connector 26 is a 50-position male plastic shell ribbon connector, wiring assembly 34 is a 25-pair twisted pair flat cable, and connector 32 is a card edge connector. Other conventional connectors and wiring means may be substituted as necessary to accommodate the equipment in any given system.

As seen in FIGS. 3 and 4, board 38 has twelve connectors 40 operatively secured thereto, electrically connected to terminal 36 by means of conventional conductive paths formed on the top and bottom surfaces of board 38. The conductive paths are not shown for the sake of clarity, but it is expected that those skilled in the art will readily comprehend their structure and function. Hard wired into connectors 40 are cables 42, preferably comprising eight-wire untwisted pair (UTP) cable, each leading to a separate workstation for the transmission of data and/or voice signals. When assembled and connected as shown, twelve workstations are interconnected with hub 14, with no additional patch panels or intermediate components necessary. It has been found that this arrangement is particularly well-suited for systems operating at 10 megahertz, i.e., Category 3 systems.

In face 20 of module 16 are twelve jacks 44, each being electrically connected to terminal 36 of board 38 by the aforementioned conductive paths. In the embodiment shown, jacks 44 comprise conventional RJ45 connectors, but could be replaced by other types of connectors without departing from the scope of this invention. With connector 32 secured to terminal 36, jacks 44 serve as test ports for monitoring the performance of each workstation and its related circuitry. If it becomes necessary or desirable to upgrade hub 14, such as to a Category 5 system operating at 100 megahertz, connector 32 may be disconnected from board 38, and the upgraded hub plugged into jacks 44 to establish an electrical connection with the workstations through connectors 40 and cables 42. Accordingly, module 16 enables a LAN system to be upgraded with minimal effort.

Figure 5:
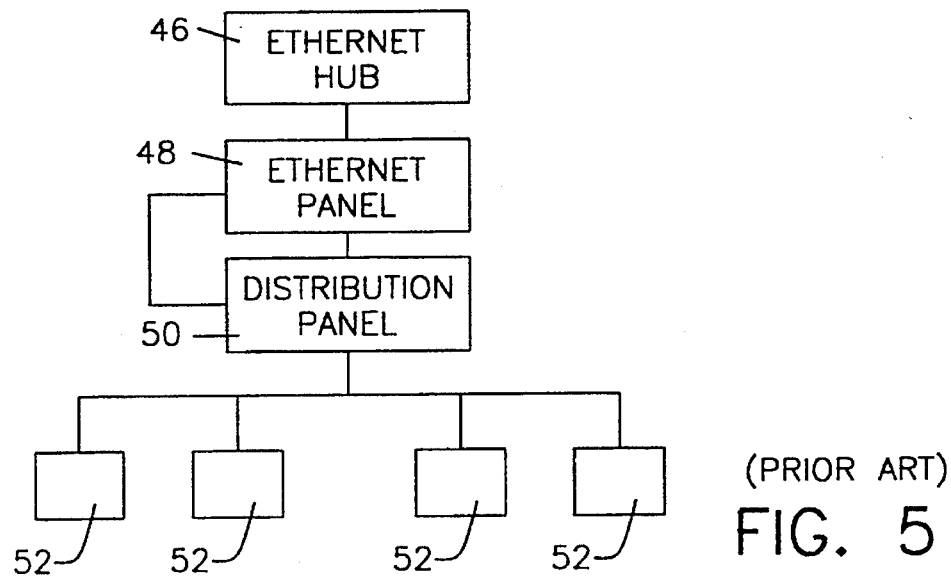
FIG. 5 is a block diagram illustrating a prior art network system.
Figure 6:
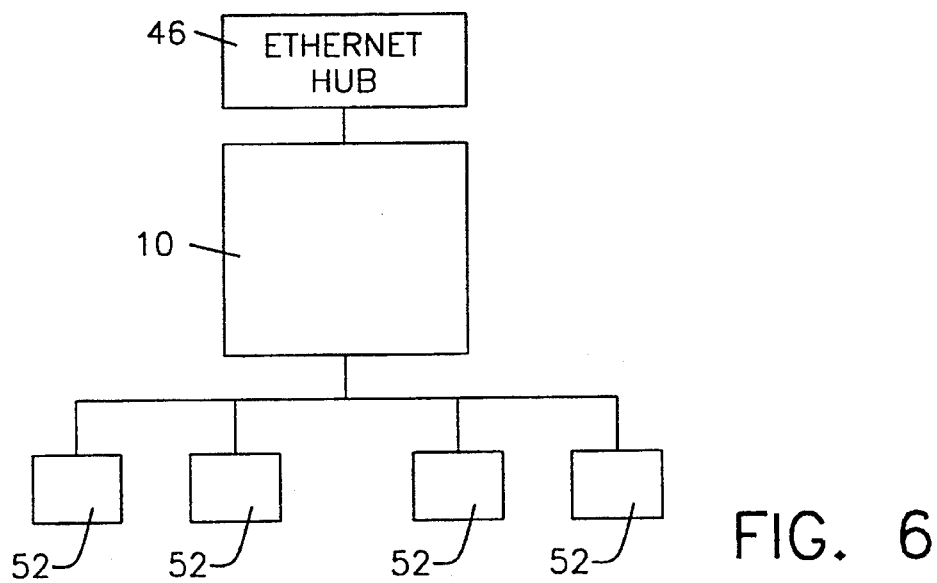
FIG. 6 is a block diagram illustrating a network system incorporating the connector module of the present invention.

FIG. 5 illustrates schematically a conventional LAN system known as Ethernet, while FIG. 6 illustrates the same system incorporating the advantages of this invention. As shown in FIG. 5, the conventional system comprises an Ethernet hub 46 connected to an Ethernet panel 48, with panel 48 being connected to a distribution panel 50 which communicates directly with a plurality of workstations 52. As those skilled in the art will appreciate, numerous cables, wires, and connectors are typically required to complete the connections between panel 48 and panel 50 in a conventional system. Referring now to FIG. 6, Ethernet hub 46 is shown connected to cabinet 10 incorporating module 16 which, in turn, is connected to workstations 52. With the system shown in FIG. 6, each workstation 52 includes a cable 42 operatively connected thereto and routed to module 16. Each workstation 52 is interconnected with hub 46 in the manner described above relating to hub 14. (Hub 46 serves essentially the same purpose as hub 14 shown in FIG. 1; hub 46 is a specific type of hub, while hub 14 is intended to represent a generic hub). Accordingly, the use of cabinet 10 with module 16 eliminates the need for a separate Ethernet panel 48 and distribution panel 50 and significantly reduces the number of wires and individual connections needed to complete the system.

As described hereinabove, panel 16 includes twelve jacks 44. The number of jacks 44 selected for purposes of this disclosure is simply for compatibility with existing systems and hardware, and in no way implies a limitation on this invention. Similarly, the block diagrams shown in FIGS. 5 and 6 display four workstations 52 solely for the sake of illustrative simplicity. In reality, a networking system will have numerous workstations supported by a given hub, and may also include a plurality of interconnected hubs.

While the principles of a connector module for use in a local area network providing greatly simplified installation and upgrading capabilities have been made clear from the foregoing detailed description, it is to be understood that the scope and coverage provided by this patent should not be limited to the preferred embodiment disclosed herein. The scope of coverage provided by this patent should only be limited by the following claims and prior art.

What is claimed is:

1. A connector module for use in a local-area network having a plurality of workstations in communication with a hub having a port associated therewith, said port being adapted for operative connection with a first end of a cable, said module being operative to interconnect at least one workstation to the hub, said module comprising:

a panel, having a face portion;

a first connector disposed within said face portion of said panel, said first connector being adapted for operative connection to a second end of said cable;

a printed circuit board mounted to said panel, having at least one electrically conductive path disposed thereon;

a second connector removably attached to said circuit board and electrically connected to said at least one path;

wiring means electrically interconnecting said first and second connectors; and a third connector mounted on said printed circuit board and in electrical connection with said at least one path, said third connector being adapted for operative connection to said workstation, whereby connection of said workstation to said third connector electrically interconnects said workstation and said hub.

2. A connector module according to claim 1, further comprising:

a fourth connector mounted in said panel, accessible through said face and in electrical connection with said at least one path, operative as a test port for said workstation.

3. A connector module according to claim 1, wherein:

said printed circuit board includes a plurality of said electrically conductive paths disposed thereon, said paths communicating with an edge terminal disposed on a card, said second connector being electrically connected to said terminal.

4. A connector module according to claim 1, wherein:

said second connector is separable from said at least one path, thereby electrically disconnecting said printed circuit board from said hub; and a fourth connector is mounted in said panel in electrical connection with said at least one path and said third connector, said fourth connector being electrically connectable to a said hub, whereby said workstation is operatively connectable to said hub through said fourth connector.

5. A connector module according to claim 1, wherein:

said wiring means comprises a twisted pair flat cable having first and second ends; and said first connector comprises a ribbon connector operatively secured to said first end of said cable and mounted to said face of said panel; and said second connector comprises a card edge connector operatively secured to said second end of said cable and removably attached to said printed circuit board.

6. A connector module according to claim 5, wherein:

said twisted pair flat cable includes twenty five pairs of wires.

7. A connector module for selectively interconnecting a plurality of workstations to a first or second hub, each said hub having a port with cable means associated therewith, said module comprising:

a panel, having a face portion;

a first connector mounted to said panel, adapted for operative connection to said cable means associated with said first hub;

a printed circuit board mounted to said panel, having a plurality of electrically conductive paths disposed thereon;

a second connector removably attached to said circuit board and electrically connected to said plurality of paths;

wiring means electrically interconnecting said first and second connectors;

a plurality of third connectors mounted on said printed circuit board and in electrical connection with said plurality of paths, each said third connector being adapted for operative connection to one of said workstations, whereby connection of said workstations to said third connectors operatively interconnects said workstations and said first hub; and a plurality of fourth connectors mounted to said panel and electrically connected to said plurality of paths, said fourth connectors being adapted for electrical connection to said cable means associated with said second hub, whereby disconnecting said second connector from said circuit board and connecting said fourth connectors to said cable means associated with said second hub operatively interconnects said workstations to said second hub.

8. A connector panel according to claim 7, wherein:

said fourth connectors are mounted to said face of said panel and accessible therethrough.

9. A connector module according to claim 7, said wiring means comprises a twisted pair flat cable having first and second ends; and said first connector comprises a ribbon connector operatively secured to said first end of said cable and mounted to said face of said panel; and said second connector comprises a card edge connector operatively secured to said second end of said cable and removably attached to said printed circuit board.

10. A connector module according to claim 9, wherein:

said twisted pair flat cable includes twenty five pairs of wires.

* * * * *